United States Patent Office 3,803,237
Patented Apr. 9, 1974

3,803,237
REACTION PRODUCTS OF POLYETHYLENEPOLY-AMINES AND CHLOROHYDRINS OR EPOXY CONTAINING COMPOUNDS
Daniel Lednicer and Clifford Y. Peery, Portage, Mich., assignors to The Upjohn Company, Kalamazoo, Mich.
No Drawing. Continuation-in-part of abandoned application Ser. No. 873,619, Nov. 3, 1969. This application Sept. 30, 1970, Ser. No. 77,038
Int. Cl. C08g 33/06
U.S. Cl. 260—584 R      7 Claims

ABSTRACT OF THE DISCLOSURE

A polyethylenepolyamine and a bifunctional substance containing halogen and/or epoxy groups are copolymerized in the presence of water, a hydrophobic solvent and a surface active alkali metal salt of an alkylarylsulfonic acid to yield a copolymer in bead form. The copolymer is useful as a hypocholesteremic agent for animals, including mammals.

CROSS REFERENCE TO RELATED APPLICATION

This application is a continuation-in-part of pending application Ser. No. 873,619, filed Nov. 3, 1969, now abandoned.

BRIEF SUMMARY OF THE INVENTION

This invention relates to a novel process for copolymerizing a polyethylenepolyamine and a bifunctional substance containing halogen and/or epoxy groups under highly selective conditions to give a copolymer in bead form. The bead form of the copolymer allows it to be filtered and otherwise handled as if it were crystalline.

The process involved (a) dispersing, with mechanical agitation, an aqueous solution of a polyethylenepolyamine, such as tetraethylenepentamine, and an alkali metal salt of an alkylarylsulfonic acid wherein the alkyl group of said acid has from 10 to 18 carbon atoms, inclusive, in a hydrophobic solvent which is selected from the group consisting of aromatic hydrocarbons and chlorinated hydrocarbons; (b) adding a bifunctional substance, such as epichlorohydrin, to the dispersion prepared in (a); (c) heating the resulting mixture for a period of about 1 to 5 hours; (d) treating the reaction mixture from (c) with an aqueous solution of an alkali metal hydroxide, e.g., sodium or potassium hydroxide; and (e) recovering the copolymer from the reaction mixture.

DETAILED DESCRIPTION

The polyethylenepolyamines used in preparing the copolymers are those of the ethylenediamine series containing from 2 to about 10 ethylene units, the molecular weight ranging from about 103 to an average molecular weight of about 450. A lower member of the series, diethylenetriamine, molecular weight about 103, is usually available commercially in both pure and commercial grades. Triethylenetetramine, tetraethylenepentamine, pentaethylenehexamine, and the higher homologs are usually available as commercial grades containing aliphatic and also some cyclic polyethylenepolyamines. See, for example, the disclosure of mixed residues containing up to about 10 alkylene groups in U.S. Pat. No. 3,152,188. Commercially available polyethylpolyamines are derived, for example, from the reaction of ethylene dichloride and ammonia or the controlled polymerization of ethyleneimine. Jones, et al., J. Org. Chem., 9:125–147 (1944) describe the polymerization of ethyleneimine by catalysts such as acids, boron trifluoride and ammonia. Polyethylenepolyamines therein, described include diethylenetriamine, triethylenetetramine, tetraethylenepentamine, heptaethyleneoctamine, nonaethylenedecamine, as well as higher molecular weight polymers with lesser amounts of amino nitrogen. Gause et al., J. Amer. Chem. Soc., 73:-5457 (November) 1951 described purification of tetraethylpentamine on an ion exchange column. Hutchinson et al., J. Am. Chem. Society, 67:1966 (November) 1945 describe formation of diethylenetriamine, triethylenetetramine, tetraethylenepentamine and similar compounds of higher molecular weights, the latter being found in an "amine residue" after removal of the lower members by distillation. Ionescu and Anghelescu, Chem. Abstracts, 64:1357 (1966) describe gas chromatographic analysis of polyethylenepolyamines which indicates that ethylenediamine, diethylenetriamine, triethylenetetramine, tetraethylenepentamine and pentaethylenehexamine are usually present in mixtures. Polyalkylenepolyamines are also described and used in U.S. Pats. 2,644,760 and 3,152,188. Those described in U.S. 2,644,760 are polyamines of the ethylenediamine series and include, for example, tetraethylenepentamine, triethylenetetramine, diethylenetriamine, pentaethylenehexamine, and the like. Those described in U.S. 3,152,188 include diethylenetriamine, triethylenetetramine and tetraethylenepentamine in pure form or as mixtures, and higher polyalkylenepolyamine homologs which are usually marketed as mixed residues containing up to approximately 10 alkylene units.

Polyethyleneimines are described and used in U.S. Pats. 3,308,020 and 3,332,841. The former have an average molecular weight of about 30,000 and those in U.S. 3,332,841 have an average molecular weight of from about 800 to about 100,000. However, in the present invention, a molecular weight range of from about 103 (diethylenetriamine) to an average molecular weight of about 450 includes those polyethylenepolyamines useful for the preparation of cross-linked copolymers administered orally. The aforesaid polyethylenepolyamines are available as marketed products of various suppliers such as Dow Chemical Company, Industrial Chemical & Dye Company, Union Carbide, Aldrich Chemical Co., and Eastman Kodak. Typically supplied commercial tetraethylenepentamine (Union Carbide) has nominal values as follows: apparent specific gravity, 20/20° C., 0.9980; boiling point 760 mm., 340° C. (decomposes); completely soluble in water; flash point, ASTM method D92, Cleveland Open Cup, 365° F.

In order to prepare the copolymers for the inventive process, such polyethylenepolyamines are copolymerized and cross-linked with bifunctional compounds having epoxy groups and/or halogen atoms; for example, epichlorohydrin, glycerol - 1,3 - dichlorohydrin, 1,2:3,4-diepoxybutane, bis-epoxypropyl ether, ethylene glycol bis-epoxypropyl ether and 1,4 - butanediol bis-epoxypropyl ether according to known methods; for example, those of British Pat. 628,821; U.S. Pat. 3,002,823; Peterson and Sober, J. Am. Chem. Soc., 78:751–755 (1956), and McKernan and Ricketts, Chemistry and Industry, Nov. 21 (1959), pp. 1490–1491. Illustratively, with epichlorohydrin as cross-linking agent the copolymer contains cross-links represented by —CH$_2$CHOHCH$_2$—; with 1,2:3,4 - diepoxybutane by —CH$_2$CHOHCHOHCH$_2$—; with bis-epoxypropyl ether by

—CH$_2$CHOHCH$_2$OCH$_2$CHOHCH$_2$—

Similarly, with ethylene glycol bis-epoxypropyl ether the copolymer contains cross-links represented by

—CH$_2$CHOHCH$_2$OCH$_2$CH$_2$OCH$_2$CHOHCH$_2$— and in the case of 1,4-butanediol bis-epoxypropyl ether by

—CH$_2$CHOHCH$_2$O(CH$_2$)$_4$OCH$_2$CHOHCH$_2$—

Hence, these copolymer cross-linked products contain a residue of an aliphatic radical having three to ten carbon atoms inclusive. The content of cross-linking moiety expressed as percent by weight of the copolymer is at least 10%, preferably at least 14%, and reaches in some cases 47% or higher.

Step (c) of the process is advantageously conducted within a temperature range of about 40° to 100° C. at atmospheric pressure. When step (c) is conducted at pressures above atmospheric, the reaction temperature can be higher. For example, it can be conducted at the vessel temperature that causes the mixture to azeotropically reflux.

The preferred molar ratio of polyethylenepolyamine to bifunctional substance is about 1:2.5. However, this ratio can vary from about 1:6 to 1:1.3. The ratio of water to polyethylenepolyamine can vary from about 1.5:1 to 6:1 by weight, preferably about 4:1. The preferred volumetric ratio of hydrophobic solvent to water is about 5:1. However, this ratio can vary from about 3:1 to 13.1.

The preferred hydrophobic solvent is toluene. However, other aromatic hydrocarbons or chlorinated hydrocarbons can be used. Other solvents that can be used include the xylenes, ethylbenzene, cumene, chlorobenzene, benzene, naphthalene, 1-chloronaphthalene, dichlorobenzene, methylene chloride, and 1,2-dichloroethane.

An important aspect of this invention is the balance that must be reached between the amount of surface active agent used and the degree of agitation of the mixture. The drop size of the dispersed phase, and therefore the particle size of the product both decrease when the amount of surfactant is increased or when the degree of agitation is increased. Therefore, the amount of surface active agent and the degree of agitation should be controlled so that the product will be of particle size that will allow recovery of said product, e.g., by filtration, within a reasonable amount of time, as will be understood by those skilled in the art.

The degree of agitation will depend upon such factors as the size and geometry of the reaction vessel, the ratio of the diameter of the agitation impeller to the diameter of the vessel, and type of impeller. Therefore, for each vessel and impeller, the skilled operator can determine the proper impeller speed by trial and error.

The surface active agents that can be used in this invention are the alkali metal salts, e.g., sodium lithium or potassium salts, of alkylarylsulfonic acids wherein the alkyl group of said acid has from 10 to 18 carbon atoms, inclusive, or a mixture of the same. Illustrative of the surface active agents that can be used are sodium decylbenzenesulfonate, sodium undecylbenzenesulfonate, sodium dodecylbenzenesulfonate, potassium tridecylbenzenesulfonate, sodium octadecylbenzenesulfonate, and the like. As set forth above, the optimum amount of surface active agent can be determined by the skilled operator, taking into consideration the degree of agitation and the size and geometry of the reaction vessel. In most instances, the amount of surface active agent ranges between about 0.3 g. to 12 g. for each kilogram of polyalkylenepolyamine used in the reaction.

The amount of alkali metal hydroxide used depends upon the amount of the bifunctional substance used. The preferred molar ratio of sodium hydroxide to bifunctional substance is about 0.6:1; however, the ratio can vary from about 0.1:1 to 1:1.

The copolymer is preferably recovered from the reaction mixture by filtration; however, it can be recovered by other methods, such as centrifugation.

The polymers prepared by this process exhibit pharmacological activity in animals, including mammals. For example, a polymer prepared by reacting tetraethylenepentamine and epichlorohydrin is useful as a hypocholesteremic agent when administered orally to cockerels in dosages of 116 to 5,139 mg./kg./day.

The following example is set forth to illustrate the invention and to enable persons skilled in the art to better understand and practice the invention and is not intended to limit the same.

EXAMPLE

Into a 1,000 gallon, jacketed, glass-lined reactor equipped with baffles and a two-speed (67 and 135 r.p.m.) reversed impeller is introduced 200 g. of Richonate 60B (a 60% aqueous slurry of sodium salts of alkylbenzenesulfonic acids) and 364 l. of deionized water, followed by 90.5 kg. of tetraethylenepentamine rinsed in with 5 gallons of toluene. The solution is stirred at the low speed and then 500 gallons of toluene are added to form a dispersion. To the stirred dispersion is added 109 kg. of epichlorohydrin, rinsed in with 5 gallons of toluene, and the resulting mixture is heated at reflux for two hours. The reaction mixture is cooled to about 20° C. and then treated with 58.5 kg. of a filtered 50% aqueous solution of sodium hydroxide. The mixture is removed from the reactor and filtered, and the copolymer is collected and dried by treating it first with hot (75°–80° C.) filtered nitrogen and then with an 80° C. air stream. The resulting crude product is returned to the reactor, washed extensively with filtered deionized water (at the low speed), dried with an 80° C. air stream and blended until homogeneous to give about 155 kg. of a dry tetraethylenepentamine-epichlorohydrin copolymer hydrochloride, particle diameter 0.002–0.02 inch.

The copolymer hydrochloride prepared as described in the above example gives the following typical analytical values, it being understood that variation from batch to batch, within the ranges shown, are to be expected:

*Elemental analyses.*—C, 50.3–52.7%; H, 9.0–11.0%; Cl, 7.3–9.3%; N, 17.0–19.0%.

Ash: not to exceed 0.5%.

Moisture: not to exceed 1.0%. Particle diameter: 0.001–0.03 inch.

What is claimed is:

1. A process for preparing in bead form a cross-linked copolymerization product of (A) a polyethylenepolyamine containing from about 2 to about 10 ethylene units and having a molecular weight of from about 103 to an average molecular weight of about 450 and (B) a member selected from the group consisting of epichlorohydrin, glycerol-1,3-dichlorohydrin, 1,2:3,4 - diepoxybutane, bisepoxypropyl ether, ethylene glycol bis-epoxy-propyl ether and 1,4-butanediol bis-epoxypropyl ether, wherein said product contains by weight from about 10% to about 47% of said member which comprises:

(1) dispersing with mechanical agitation an aqueous solution of said polyethylenepolyamine and an alkali metal salt of an alkylbenzenesulfonic acid wherein the alkyl group has from 10 to 18 carbon atoms, inclusive, in a hydrophobic solvent selected from the group consisting of aromatic hydrocarbons and chlorinated hydrocarbons, the weight ratio of water to the polyethylenepolyamine being from 1.5:1 to 6:1 and the volumetric ratio of hydrophobic solvent to water being from 3:1 to 13:1;
   (2) adding a said member (B) to the dispersion, the molar ratio of the polyethylenepolyamine to the member being from 1:6 to 1:1.3;
   (3) heating the resulting mixture for 1 to 5 hours at a temperature of 40° C. to 100° C.;
   (4) treating the heated mixture with an aqueous solution of an alkali metal hydroxide; and
   (5) recovering the bead form of cross-linked copolymerization product.

2. The process of claim 1 wherein the polyethylenepolyamine is diethylenetriamine.

3. The process of claim 1 wherein the polyethylenepolyamine is triethylenetetramine.

4. The process of claim 1 wherein the polyethylenepolyamine is tetraethylenepentamine.

5. The process of claim 1 wherein the member is epichlorohydrin.

6. The process of claim 1 wherein the polyethylenepolyamine is diethylenetriamine and the member is epichlorohydrin.

7. The process of claim 1 wherein the hydrophobic solvent is toluene.

References Cited

UNITED STATES PATENTS

| | | | |
|---|---|---|---|
| 3,497,556 | 2/1970 | Lanner et al. | 260—584 |
| 2,469,683 | 5/1949 | Dudley et al. | 260—2 |
| 2,898,310 | 8/1959 | Greer | 260—2.1 |
| 2,715,118 | 8/1955 | Grim | 260—93.5 |
| 3,332,841 | 7/1967 | Ainsworth et al. | 424—78 |

FOREIGN PATENTS

| | | | |
|---|---|---|---|
| 522,323 | 3/1956 | Canada | 260—2.1 R |
| 779,178 | 7/1957 | Great Britain | 260—2.1 R |

OTHER REFERENCES

Schwartz et al.: Surface Active Agents, vol. I, Interscience Publishers, Inc., New York, 1949, pp. 92–94 and 122–131.

LEWIS GOTTS, Primary Examiner

C. F. WARREN, Assistant Examiner

U.S. Cl. X.R.

260—2 BP, 2.1 R; 424—78, 79